United States Patent
Glick et al.

(10) Patent No.: US 8,954,924 B2
(45) Date of Patent: Feb. 10, 2015

(54) DYNAMIC UPDATE OF MODULARIZED PROGRAMS IN A CONTINUATION-BASED RUNTIME

(75) Inventors: Daniel Glick, Seattle, WA (US); Jae Lee, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 660 days.

(21) Appl. No.: 13/207,347

(22) Filed: Aug. 10, 2011

(65) Prior Publication Data

US 2013/0042226 A1     Feb. 14, 2013

(51) Int. Cl.
*G06F 9/44* (2006.01)
*G06Q 10/06* (2012.01)

(52) U.S. Cl.
CPC .. *G06F 8/20* (2013.01); *G06F 8/71* (2013.01); *G06Q 10/06* (2013.01)
USPC ............ 717/105; 717/104; 717/106; 717/120

(58) Field of Classification Search
CPC .............. G06F 8/10; G06F 8/20; G06F 8/30; G06F 8/34; G06F 8/71
See application file for complete search history.

(56) References Cited

U.S. PATENT DOCUMENTS

| | | | |
|---|---|---|---|
| 7,631,291 B2 | 12/2009 | Schukla et al. | |
| 7,805,327 B1 | 9/2010 | Schulz et al. | |
| 7,827,127 B2 | 11/2010 | Wolf et al. | |
| 8,010,940 B2 * | 8/2011 | van Wyk et al. | 717/105 |
| 8,181,150 B2 * | 5/2012 | Szpak et al. | 717/104 |
| 8,291,378 B2 * | 10/2012 | Arnold et al. | 717/120 |
| 8,656,346 B2 * | 2/2014 | Kodi et al. | 717/106 |
| 2007/0245300 A1 * | 10/2007 | Chan et al. | 717/105 |
| 2007/0266368 A1 * | 11/2007 | Szpak et al. | 717/105 |
| 2009/0024986 A1 | 1/2009 | Meijer et al. | |
| 2010/0169862 A1 | 7/2010 | Wolf et al. | |
| 2010/0293538 A1 * | 11/2010 | Wolf et al. | 717/170 |
| 2011/0307856 A1 * | 12/2011 | Klaka et al. | 717/104 |

OTHER PUBLICATIONS

Crawl et al., Provenance for MapReduce-based data-intensive workflows, Nov. 2011, 9 pages.*
Plasmeijer et al., iTasks for a change: type-safe run-time change in dynamically evolving workflows, Jan. 2011, 10 pages.*
Microsoft, "Custom Provider Fundamentals," msdn, (downloaded from http://msdn.microsoft.com/en-us/library/bb902844(d=printer,v=sql.110).aspx on 07/187/2011), 2011, (9 pages).

* cited by examiner

*Primary Examiner* — Thuy Dao
(74) *Attorney, Agent, or Firm* — Ben Tabor; Kate Drakos; Micky Minhas

(57) ABSTRACT

A framework for aggregating updates for individual modules into an update for a containing module is disclosed. The containing module may be an entire program or workflow, for example. The updates may include changes to the contract of a module. Embodiments of the invention further provide a framework for detecting when changes to an inner module are incompatible with changes to the containing module.

18 Claims, 3 Drawing Sheets

DYNAMIC UPDATE OF MODULARIZED PROGRAMS IN A CONTINUATION-BASED RUNTIME

BACKGROUND

A continuation-based runtime operates by scheduling work items. Work items can be associated with a callback identifying where a procedure or activity is to be resumed. An activity represents a unit of executable code comprising multiple pulses of work. Unlike conventional computer software programs that sequentially process data, a continuation-based program communicates by registering continuations and scheduling activities as future work to perform tasks. By manipulating the scheduling of future work and child activities, a higher-level composite activity can define arbitrary control-flow constructs.

A continuation-based runtime has advantages over sequential computer software programs, such as facilitating passivation by which an activity can be persisted and resumed in a different process/thread, including on an entirely different machine.

A data model may be used in a continuation-based runtime to define data flow direction with respect to activities via parameters and to provide for data storing and sharing between activities via variables that are based on a tree relationship between activities. An activity tree includes a topmost parent composite activity and at least one child activity of that topmost parent composite activity. Variables are associated with one or more composite activities of the tree; for example, arguments such as binding expressions may bind variables to an activity's parameters.

When processing the activities of an activity tree in a continuation-based runtime, parameters represent a flow of data relative to that activity, by declaring each parameter as an input parameter, an output parameter, or an input-output parameter. Variables are declared to represent the storage of data. Scoping provides that a child activity may access variables up its parent chain. Binding expressions may be used to bind a parameter to in-scope variables.

A program definition in a continuation-based runtime may be modularized, such that modules of the program can be edited independently. These modules may be reused within the same program or in different programs. Existing systems for dynamic update do not support automatic updating when the contract of a module changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide a framework for aggregating updates for individual modules into an update for a containing module. The containing module may be an entire program or workflow, for example. The updates may include changes to the contract of a module. Embodiments of the invention further provide a framework for detecting when changes to an inner module are incompatible with changes to the containing module.

Embodiments of the invention may operate on a computer system, including a processor and a memory, for example, or may be part of a computer program product. In one embodiment, a computer-implemented method for use in a computer system provides dynamic updating of a continuation-based program in response to one or more program changes.

A workflow may comprise a plurality of activities. Changes to the original activity definitions are identified. Implementation maps are generated for applying activity changes to implementations of the activity. Each implementation map representing updates to a specific activity. Changes to an original workflow definition are also identified. An update map for the workflow is generated to apply workflow changes to implementations of the workflow. The update map may comprise implementation maps for the activities within the workflow. The update map comprising a tree of implementation maps for activities within the workflow with changed implementations. The update map is applied to a current instance of the workflow to create an updated instance. Applying the update map may comprise modifying an instance state of a program workflow according to the update map.

The updates to a specific activity may comprise changes to a contract of an activity. The changes to a contract of an activity may comprise changes to arguments, activities, and/or delegates of the activity.

An inner activity may be contained within an outer—or containing—activity. An inner activity update may be aggregated into an outer activity without having an original version of the inner activity present at the time of aggregation. In one embodiment, implementations of the inner activity that change in response to one or more changes in the outer or containing activity are detected.

Metadata relevant to an activity update may be stored. Conflict between metadata for updates to the inner activity and metadata for updates to the outer or containing activity are detected.

The update map for the workflow may be validated. The validation may comprise determining whether changes were made to an activity's arguments both inside the activity's implementation map and as part of updates to the outer activity. The validation may further comprise determining whether original values were saved for a particular activity both as part of an implementation update and as part of updates to the outer activity. The validation may comprise determining whether an implementation of any activity changed in response to changes in the outer activity.

When generating the update map, update information may be added to a current program tree for the continuation-based program to generate an updated program tree. Then, one or more differences between the current program tree and the updated program tree may be identified. One or more previously updated workflows may be accessed to ensure that newer updates do not conflict with previous updates.

The program changes may include, for example, an addition, removal or replacement of a child activity, variable, or argument expression.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
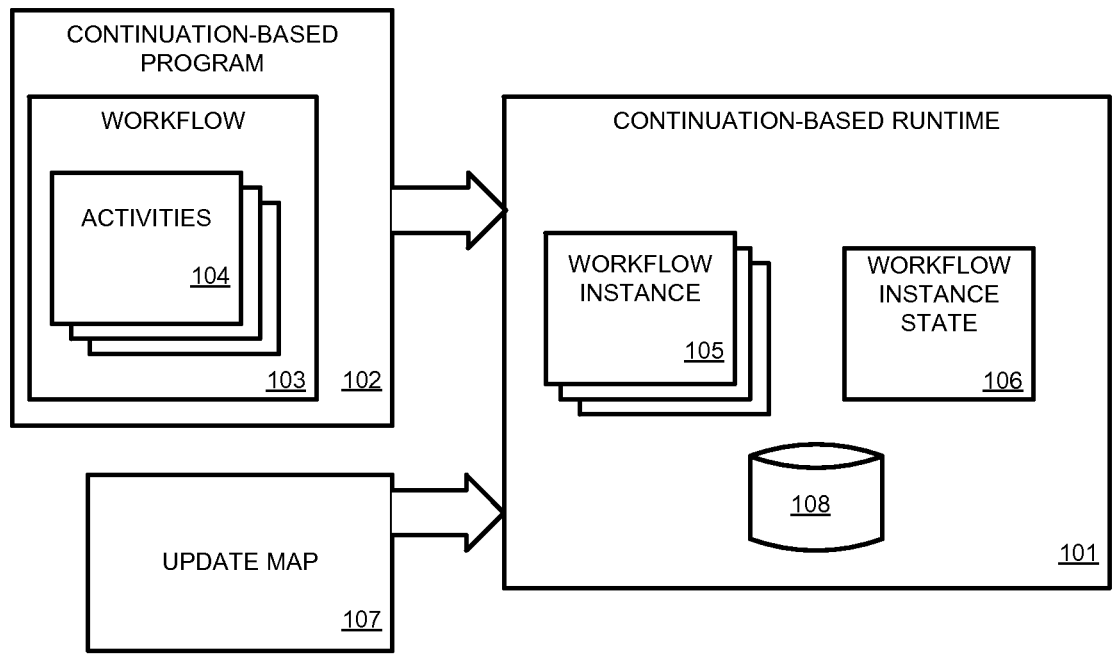
FIG. 1 illustrates a continuation-based runtime that may be configured to execute a continuation-based program.

FIG. 1 illustrates a continuation-based runtime 101 that may be configured to execute a continuation-based program 102. Program 102 includes workflow 103 comprising activities 104, which may each include one or more associated work items. Activities 104 may be organized, for example, as a tree or hierarchy of parent and child activities. It will be understood that continuation-based program 102 may include multiple workflows 102, multiple activities 104, and/or multiple work items. Continuation-based runtime 101 executes activities 104, which may be any unit of executable code including one or more work items. An activity may execute multiple work items by scheduling child activities. Composite activities enable custom control flows that may be implemented through the scheduling of child activities.

An activity may setup a resumable continuation in its execution that is resumed, for example, by a stimulus external to the runtime. The continuation-based runtime may interpret this external stimulus as another item of work to be handled by the activity. Work items are represented internally as continuations that the runtime invokes on activities. Beyond this flexibility to create control flows and handle external resumptions, activities have no process affinity so that they can be paused and resumed in a different process, have no thread affinity so that different items of work can be run on different threads, and can be stored and reloaded at a later point in time.

Continuation-based runtime 101 may execute program 102 using one or more workflow instances 105. Data associated with workflow instances 105 may be stored in workflow instance state 106. Workflow instance state 106 may be configured to store one or more portions of state information relating to workflow 103, continuation-based program 102 and/or activities 104. A workflow's instance state 106 may include multiple portions of state each corresponding to a different workflow activity.

Workflow instance state 106 may store a workflow version number that indicates which workflow version number associated with the workflow. Accordingly, if continuation-based program 102 is run on multiple threads, or is long-running and is unloaded for a period of time and then reloaded, the stored workflow instance state 1016 will indicate which version number is associated with the workflow.

At times, continuation-based runtime 101 may receive updates for program 102 or workflow 103, such as an update map 107 that identifies the differences between two versions of workflow 103. The workflow instance version number may be used to determine which activities have a new version and which instances 105 need to be updated. This information may be used to update the entire workflow to a new version, or to update various activities to newer versions. When program 102 is updated, it is possible to choose on an instance-by-instance basis whether to update a particular running workflow instance 105.

Program 102 may be persisted using workflow instance state 106 or a data store 108. Program 102 may be paused and its content, arguments, and variables may be stored for later use when the program is resumed. In some embodiments, a copy of each program or version may be stored in data store 108, which may be a database, local storage, distributed storage or other type of data store. Thus, if a program owner or user wishes to roll back to a previous version or simply wishes to run or view the code in a previous form, the version is stored and is accessible. Moreover, it should be noted that, in addition or as an alternative to storing the program, a workflow, activity or selected group of workflows or activities may be stored at each revision.

Figure 2:
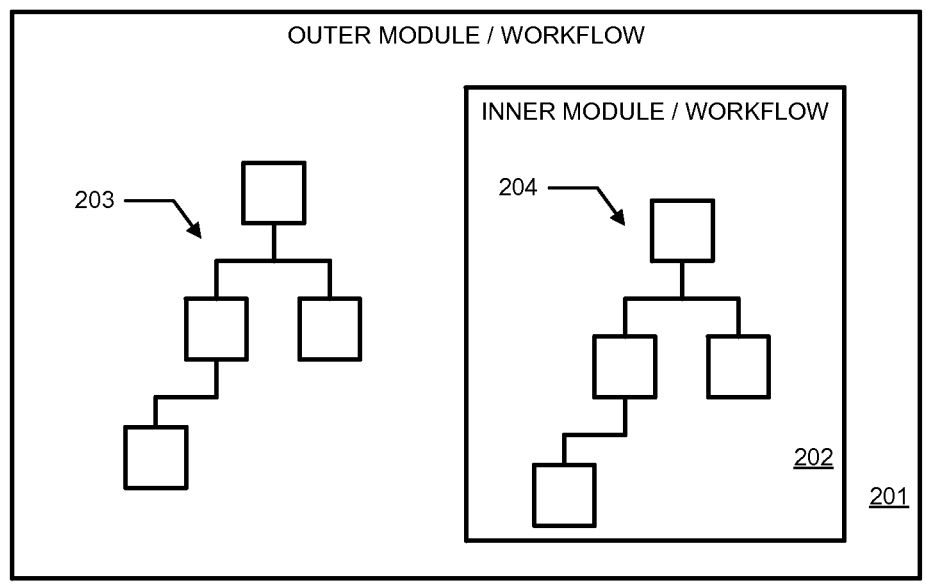
FIG. 2 illustrates a situation in which an outer module or workflow runs an inner module or workflow.

FIG. 2 illustrates a situation in which an outer module or workflow 201 runs an inner module or workflow 202. Outer module 201 has a tree of activities 203, and inner module 202 has tree of activities 204, which may be the same as or different from tree 203. In one embodiment, when a program is updated, the update map for each module is aggregated by rolling the update maps for the inner module 202 into the update map for the outer module 201. Conflicts may arise when an instance is updated if the activities in an inner module and an outer module are inconsistently modified by the update.

Dynamically updating a program definition involves three steps: preparation, finalization, and application.

During the preparation step, the runtime adds additional information to the program tree. This information may be included in an XAML serialization of the tree. Once a definition has been prepared, then it can be edited such as by loading the program in a designer, adding/removing/changing the activity tree, and then saving the program definition again.

During the finalization step, the runtime determines differences between the prepared tree and the current tree. This involves creation of a dynamic update map that can be used by the runtime to apply the update to any running instance. The dynamic update map is also part of the XAML serialized state of the tree. If the tree already contains a dynamic update map, the new one may be added to the list. In this way, the definition always has the information necessary to update from any previous revision to the current revision.

During the application step, the runtime takes a finalized tree, extracts the update map, and modifies an instance's state accordingly.

Figure 3:
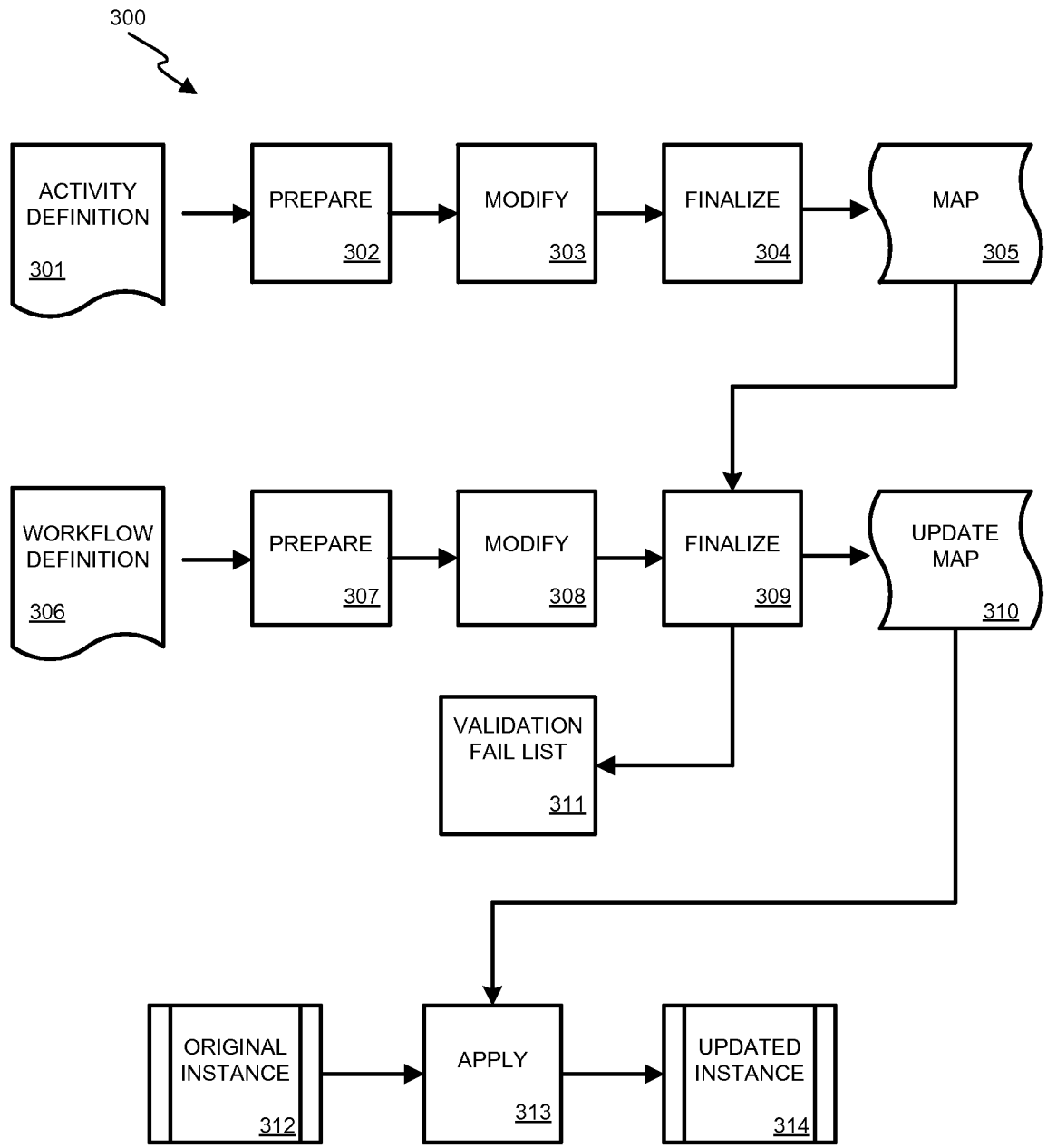
FIG. 3 illustrates one embodiment of an update process comprising various sub-processes.

FIG. 3 illustrates one embodiment of an update process 300 comprising three sub-processes. The first sub-process (302-304) is the creation of an implementation map 305 for an activity 301. The second sub-process (307-309) is the creation of an update map 310 for a workflow 306, wherein update map 310 includes implementation map 305. This second sub-process can be repeated recursively for updateable activities that contain other updateable activities. The third sub-process (313) is the application of a single, final map that contains all the implementation updates.

An activity definition 301 defines a single module that can be reused in multiple program definitions for the continuation-based runtime. The activity definition 301 is prepared in step 302 by creating an XAML file based upon the activities in activity definition 301 and their associated version numbers. A designer may be used in step 303 to modify or edit the XAML file for the module. In finalize step 304, an implementation map is created that can be used by the runtime to update any running instance of the module defined by activity definition 301.

The prepare, modify and finalize steps 302-304 may be applied to individual modules. Implementation map 305 may be applied to any module in the activity tree and is not limited to the top-most or parent module. The prepare 302 and finalize 304 steps may be applied on any activity definition 301 to create a dynamic update map, such as implementation map 305, for just that module. Implementation map 305 also contains the arguments of the activity, such as a specification of data values that can be passed in or out of the module at runtime, both before and after the update.

Additionally, the prepare, modify and finalize steps 307-309 may be applied to a full workflow, program definition, or an activity that contains other updateable activities, such as workflow definition 306. When operating on a workflow definition 306, the finalize step 309 executes a callback on each activity in the program definition. The activity may inspect any changes to its configuration as part of the update. The activity may either disallow the update, which will block applying the update only to instances where the activity is executing, or store the original configuration values into a dynamic update map 310, if the original configuration values will be needed when applying the update.

When the finalize step 309 is performed on a full workflow, program definition, or an activity that contains other updateable activities, an implementation map 305 can be designated for any activity whose implementation was updated independently. The finalize step 309 relies on a full program definition created using only the updated version of the inner activities, and performs the following validations:

whether there were changes to an activity's arguments both inside the implementation map, and as part of the containing activity update;

whether original values were saved for the same activity both as part of the implementation update and the containing activity update (indicating that the same activity changed as part of both updates); and whether the implementation of any activity changed in response to changes in the containing activity In case of successful validation, the final update map 310 includes a tree of implementation maps for activities with changed implementations, including saved original values and any argument changes.

In addition to producing an update map 310, the finalize step 309 outputs a list 311 of all activities which failed these validations. An apply step 313 may be disabled for any instances that are executing an activity that failed the validation.

The apply step 313 is performed on each workflow instance. There may be many running instances of a given program definition. The apply step 313 updates the revision count of the whole program and of any updated activity implementations within the program. Apply step 313 includes a callback for each executing activity, during which the activity can access any original values saved in the map.

In one embodiment, a merge step is also available. The merge step receives maps for individual revisions to an activity or an entire workflow and combines the maps into a single map that can be used to update to the latest revision as one atomic step.

The process illustrated in FIG. 3 provides the ability to change the contract of an activity, such as the arguments, activities, and delegates of the activity, as part of an update. Additionally, activity updates may be aggregated an into a containing activity (i.e. an outer activity having one or more inner activities) without requiring that the original version of the inner activity be present at the time of aggregation. The process detects when an inner activity's implementation has changed in response to changes in the containing activity. Embodiments of the invention further provide a framework for control-flow activities to store metadata relevant to an update, and an algorithm for determining when there is a conflict between the metadata for updates to an inner activity and a containing activity.

Figure 4:
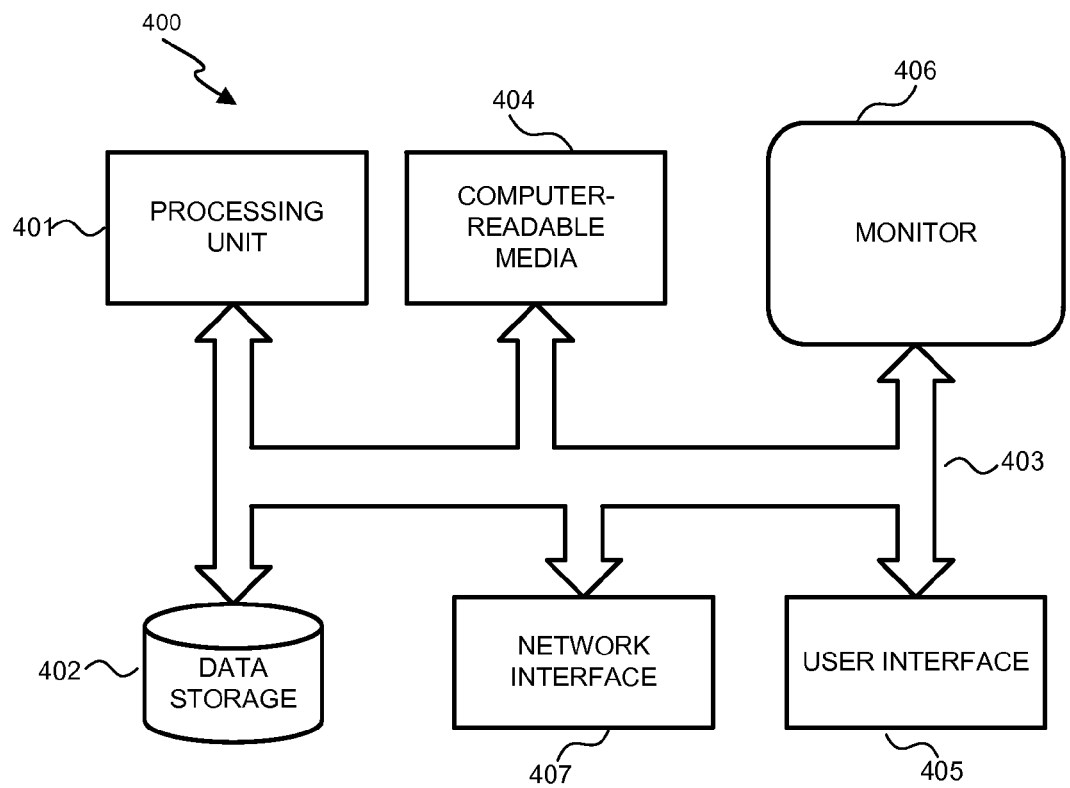
FIG. 4 illustrates an example of a suitable computing and networking environment on which the examples of FIGS. 1-3 may be implemented.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Computing environment 400 should not be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, processing unit 401, data storage 402, such as a system memory, and system bus 403 that couples various system components including the data storage 402 to the processing unit 401. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 504 may be any available media that can be accessed by the computer 401 and includes both volatile and nonvolatile media, and removable and non-removable media. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The data storage or system memory 402 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 401. By way of example, and not limitation, data storage 402 holds an operating system, application programs, and other program modules and program data.

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information into the computer 410 through a user interface 405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 401 through a user input interface 405 that is coupled to the system bus 403, but may be connected by other interface and bus structures, such as a parallel port, game port or a universal serial bus (USB). A monitor 406 or other type of display device is also connected to the system bus 403 via an interface, such as a video interface. The monitor 406 may also be integrated with a touch-screen panel or the like. Note that the monitor and/or touch screen panel can be physically coupled to a housing in which the computing device 400 is incorporated, such as in a tablet-type personal computer. In addition, computers such as the computing device 400 may also include other peripheral output devices such as speakers and printer, which may be connected through an output peripheral interface or the like.

The computer 400 may operate in a networked environment using logical connections 407 to one or more remote computers, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a LAN networking environment, the computer 400 may be connected to a LAN through a network interface or adapter 407. When used in a WAN networking environment, the computer 400 typically includes a modem or other means for establishing communications over the WAN, such as the Internet. The modem, which may be internal or external, may be connected to the system bus 403 via the network interface 407 or other appropriate mechanism. A wireless networking component such as comprising an interface and antenna may be coupled through a suitable device such as an access point or peer computer to a WAN or LAN. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for dynamically updating a continuation-based program in response to one or more program changes, the method comprising:

receiving one or more original activity definitions;

identifying changes to the original activity definitions;

generating an implementation map for applying activity changes to implementations of the activity;

receiving an original workflow definition;

identifying changes to the original workflow definition;

identifying implementation maps for activities within the workflow;

generating an update map for the workflow for applying workflow changes to implementations of the workflow, the update map comprising implementation maps for the activities within the workflow; and applying the update map to a current instance of the workflow to create an updated instance.

2. The computer-implemented method of claim 1, wherein an inner activity is contained within an outer activity, and wherein the generating an update map further comprises:

aggregating an inner activity update into an outer activity without having an original version of the inner activity present at the time of aggregation.

3. The computer-implemented method of claim 1, wherein an inner activity is contained within an outer activity, the method further comprising:

detecting when an implementation of the inner activity has changed in response to one or more changes in the outer activity.

4. The computer-implemented method of claim 1, wherein an inner activity is contained within an outer activity, the method further comprising:
  storing metadata relevant to an activity update; and
  determining when there is a conflict between metadata for updates to the inner activity and metadata for updates to the outer activity.

5. The computer-implemented method of claim 1, wherein an inner activity is contained within an outer activity, the method further comprising:
  validating the update map for the workflow.

6. The computer-implemented method of claim 5, wherein the validating comprises:
  determining whether changes were made to an activity's arguments both inside the activity's implementation map and as part of updates to the outer activity.

7. The computer-implemented method of claim 5, wherein the validating comprises:
  determining whether original values were saved for a particular activity both as part of an implementation update and as part of updates to the outer activity.

8. The computer-implemented method of claim 5, wherein the validating comprises:
  determining whether an implementation of any activity changed in response to changes in the outer activity.

9. The computer-implemented method of claim 1, wherein generating the update map further comprises:
  adding update information to a current program tree for the continuation-based program to generate an updated program tree; and
  determining one or more differences between the current program tree and the updated program tree.

10. The computer-implemented method of claim 9, wherein determining one or more differences between the current program tree and the updated program tree further comprises:
  accessing at least one previously updated workflow to ensure that newer updates do not conflict with previous updates.

11. The computer-implemented method of claim 1, wherein the applying further comprises:
  modifying an instance state of a program workflow according to the update map.

12. The computer-implemented method of claim 1, wherein the program changes include an addition, removal or replacement of a child activity.

13. The computer-implemented method of claim 1, wherein the program changes include an addition, removal or replacement of a variable or an argument.

14. The computer-implemented method of claim 1, wherein the program changes include a modification of an argument expression or a default expression or a variable.

15. A computer program device for modifying the workflow instance state of a continuation-based program, the computer program device comprising one or more computer-readable storage media memories having stored thereon computer-executable instructions that, upon execution by one or more processors of a computing system, cause the computing system to:
  receive one or more original activity definitions;
  identify changes to the original activity definitions;
  generate an implementation map for applying activity changes to implementations of the activity;
  receive an original workflow definition;
  identify changes to the original workflow definition;
  identify implementation maps for activities within the workflow;
  generate an update map for the workflow for applying workflow changes to implementations of the workflow, the update map comprising implementation maps for the activities within the workflow; and
  apply the update map to a current instance of the workflow to create an updated instance.

16. The computer program device of claim 15, wherein the computer-executable instructions, upon execution by the computing system, further cause the computing system to:
  determine when there is a conflict between updates to an inner activity and a containing activity.

17. The computer program device of claim 15, wherein the computer-executable instructions, upon execution by the computing system, further cause the computing system to:
  validate the update map by determining:
  whether an activity's arguments changed both inside the implementation map and as part of a containing activity update;
  whether original values were saved a particular activity both as part of an implementation update and an containing activity update; and
  whether implementation of any activity changed in response to changes in a containing activity.

18. A computer system for dynamically updating a continuation-based program in response to one or more program changes, the computer system comprising:
  one or more processors; and
  a memory coupled to the one or more processors, the memory having program instructions stored thereon that, upon execution by the one or more processors, cause the computer system to:
  receive one or more original activity definitions;
  identify changes to the original activity definitions;
  generate an implementation map for applying activity changes to implementations of the activity;
  receive an original workflow definition;
  identify changes to the original workflow definition;
  identify implementation maps for activities within the workflow;
  generate an update map for the workflow for applying workflow changes to implementations of the workflow, the update map comprising implementation maps for the activities within the workflow; and
  apply the update map to a current instance of the workflow to create an updated instance.

* * * * *